(12) United States Patent
Büttner (10) Patent No.: US 11,105,654 B2
(45) Date of Patent: Aug. 31, 2021

(54) WARNING A USER OF A VEHICLE WITH AN ENERGY STORAGE UNIT AGAINST AN ENERGY SHORTAGE

(71) Applicant: Preh Car Connect GmbH, Dresden (DE)

(72) Inventor: Frank Büttner, Dresden (DE)

(73) Assignee: Preh Car Connect GMBH, Dresden (DE)

(*) Notice: Subject to any disclaimer, the term of this patent is extended or adjusted under 35 U.S.C. 154(b) by 140 days.

(21) Appl. No.: 16/226,159

(22) Filed: Dec. 19, 2018

(65) Prior Publication Data

US 2019/0204111 A1 Jul. 4, 2019

(30) Foreign Application Priority Data

Jan. 2, 2018 (DE) .......................... 102018000014.2

(51) Int. Cl.
| | |
|---|---|
| *G01C 21/34* | (2006.01) |
| *B60K 35/00* | (2006.01) |
| *G01C 21/36* | (2006.01) |
| *B60L 58/12* | (2019.01) |
| *B60W 50/14* | (2020.01) |

(52) U.S. Cl.
CPC .......... *G01C 21/3697* (2013.01); *B60L 58/12* (2019.02); *B60W 50/14* (2013.01); *G01C 21/3469* (2013.01); *G01C 21/3679* (2013.01); *B60W 2050/143* (2013.01)

(58) Field of Classification Search
CPC ........ G01C 21/36; G01C 21/34; G01C 22/00; G01C 21/30; G01C 21/3469; G01C 21/3492; G05D 1/00; G06G 7/78; B60K 35/00
See application file for complete search history.

(56) References Cited

U.S. PATENT DOCUMENTS

| 5,487,002 | A | * | 1/1996 | Diller | ..................... G01C 21/26 |
|---|---|---|---|---|---|
| | | | | | 701/1 |
| 9,043,134 | B2 | * | 5/2015 | Rosekrans | ......... G01C 21/3697 |
| | | | | | 701/409 |

(Continued)

FOREIGN PATENT DOCUMENTS

| CN | 104848868 A | * | 8/2015 | ............. G01C 21/34 |
|---|---|---|---|---|
| DE | 112011104957 | | 11/2013 | |

(Continued)

*Primary Examiner* — Yuri Kan (74) *Attorney, Agent, or Firm* — M&B IP Analysts, LLC (57) ABSTRACT

The present disclosure relates to a method and device for warning a user of a vehicle with an energy storage unit against an energy shortage. According to the present disclosure, an energy quantity is determined that is stored in the energy storage unit at a branching point of a path driven on by the vehicle, and a direction option of the vehicle at the branching point is selected. Further, the one route is determined that is associated with the direction option and starts at the branching point, on which the vehicle is able to reach with the lowest expected energy requirement an energy charging location at which the energy storage unit can be charged. The energy requirement is compared with the energy quantity, and a warning indication is outputted with which the user is warned against the direction option if the energy requirement is greater than the energy quantity.

7 Claims, 4 Drawing Sheets

(56) References Cited

U.S. PATENT DOCUMENTS

| | | | |
|---|---|---|---|
| 9,759,572 B2* | 9/2017 | Okada | B60L 58/12 |
| 2010/0138142 A1* | 6/2010 | Pease | B60L 58/24 |
| | | | 701/123 |
| 2011/0032110 A1* | 2/2011 | Taguchi | B60L 3/12 |
| | | | 340/636.1 |
| 2012/0109515 A1* | 5/2012 | Uyeki | G01C 21/3469 |
| | | | 701/423 |
| 2012/0179420 A1* | 7/2012 | Gilman | G01C 21/3697 |
| | | | 702/165 |
| 2015/0204683 A1* | 7/2015 | Stahlin | G01C 21/3415 |
| | | | 701/411 |
| 2015/0226567 A1 | 8/2015 | North et al. | |
| 2016/0131498 A1* | 5/2016 | Rosekrans | G01C 21/3469 |
| | | | 701/123 |
| 2017/0370738 A1 | 12/2017 | Park et al. | |
| 2018/0173219 A1* | 6/2018 | Lee | G05D 1/0005 |

FOREIGN PATENT DOCUMENTS

| | | |
|---|---|---|
| DE | 102013003411 A1 | 8/2014 |
| JP | 2014081286 A | 5/2014 |

\* cited by examiner

WARNING A USER OF A VEHICLE WITH AN ENERGY STORAGE UNIT AGAINST AN ENERGY SHORTAGE

This application claims priority to the German Application No. 10 2018 000 014.2, filed Jan. 2, 2018, now pending, the contents of which are hereby incorporated by reference.

The present disclosure relates to a method and a warning device for warning a user of a vehicle with an energy storage unit against an energy shortage.

A vehicle with an energy storage unit is dependent on the energy storage unit being filled or charged if necessary. In particular, the drive energy storage unit is required to be charged in due time in order to prevent a vehicle having a breakdown due to an energy shortage. A breakdown may have unwanted consequences for a user of the vehicle, e.g. a late arrival or missing an appointment. Furthermore, the breakdown may have dangerous consequences, e.g. on a traffic route with a high traffic density and no parking opportunity, or in an area that is remote or dangerous for passengers.

In order to charge an energy storage unit of a vehicle, the vehicle generally has to be moved to an energy charging location at which the energy storage unit can be charged.

A vehicle with an internal combustion engine has, as an energy storage unit, a fuel tank in which fuel for the internal combustion engine is stored. Energy charging locations for such a vehicle are service stations at which the fuel tank can be filled with fuel.

A vehicle driven with electrical energy may have, as an energy storage unit, a traction battery for storing electrical energy, which is normally built into the vehicle. In this case, energy charging locations for the vehicle have charging stations at which the traction battery can be charged. Alternatively, a traction battery can be disposed in a vehicle in a replaceable manner. In this case, energy charging locations may be provided at which the traction battery can be replaced.

In addition to drive energy storage unit, a vehicle may have another energy storage unit, e.g. an energy storage unit for an air-conditioning system or a lighting system of the vehicle. Moreover, a vehicle may have an energy storage unit for various purposes, e.g. the drive unit, air-conditioning system and/or vehicle lighting system. In the following, a vehicle energy storage unit is understood to mean any energy storage unit, i.e. an energy storage unit only for drive energy, and energy storage unit only for energy used for purposes other than driving the vehicle, or an energy storage unit for drive energy and other energy.

It is the object of the present disclosure to reliably warn a user of a vehicle with an energy storage unit against an energy shortage.

The object is achieved with the method of the present disclosure for warning a user of a vehicle with an energy storage unit against an energy shortage. The method has the following steps:

a) determining an energy quantity stored in the energy storage unit at a branching point of a path driven on by the vehicle, b) selecting a direction option of the vehicle at the branching point, c) determining the one route that is associated with the direction option and starts at the branching point, on which the vehicle is able to reach with the lowest expected energy requirement an energy charging location at which the energy storage unit can be charged, d) comparing the energy requirement with the energy quantity, and e) outputting a warning indication with which the user is warned against the direction option if the energy requirement is greater than the energy quantity.

It is to be noted that the vehicle may be a road vehicle, rail vehicle, watercraft or an aircraft. Accordingly, the path may be a road, a rail track, a waterway or an airway. A branching point is a location at which several paths meet, e.g. an intersection. The above-mentioned energy requirement may be understood to mean the requirement for energy stored in the energy storage unit.

The method takes into account that generally, several direction options for continuing travel exist at a branching point of a path driven on by the vehicle, e.g. the direction options of straight ahead, towards the left and towards the right. Accordingly, the method provides the selection of one of the direction options at the branching point. For the selected direction option it is determined whether an energy charging location can be reached without completely depleting the energy storage unit first if travel is continued in accordance with this direction option, i.e. in the direction associated with the direction option.

If it is found that no such energy charging location exists, the user of the vehicle is warned against the direction option by outputting a warning indication. Thus, the user is advised of the risk, in the case of travel according to the direction option, of the energy storage unit being expected to be completely depleted before it can be charged. In the case that the drive energy of the vehicle being stored in the energy storage unit, the user is thus advised that there is a risk of a breakdown of the vehicle.

In order to determine if an energy charging location that can be reached without prior complete depletion of the energy storage unit is expected to exist in the case of travel being continued in accordance with the selected direction option, the method provides the following: The one route associated with the direction option is determined on which the vehicle is able to reach with the lowest expected energy requirement an energy charging location at which the energy storage unit can be charged. The expected energy requirement is compared with the energy quantity stored in the energy storage unit at the branching point. If the energy requirement is greater than the energy quantity, the warning indication is outputted. In this case, the energy stored in the energy storage unit at the branching point is insufficient for covering the energy requirement.

In one embodiment of the present disclosure, the energy quantity stored in the energy storage unit at the branching point is determined before the vehicle reaches the branching point. This enables the warning indication to be output particularly early, whereby it is ensured that the user is able to make a decision for or against the direction option in due time. In particular, it is thus avoided that the user has to slow down or interrupt his travel for the decision.

In another embodiment of the present disclosure, the route with the lowest expected energy requirement is determined by determining several routes that are associated with the direction option and start at the branching point, on which the vehicle is able in each case to reach an energy charging location at which the energy storage unit can be charged, calculating an expected energy requirement for each of the routes, and selecting the one of the routes with the lowest calculated energy requirement. This procedure enables a particularly precise determination of the route with the lowest expected energy requirement.

For example, each of the routes associated with the direction option leads to a different energy charging location, whereby the route with the lowest expected energy requirement can be determined even more precisely.

In another embodiment of the present disclosure, the warning indication includes displaying a direction arrow corresponding to the direction option. Thus, the warning indication can be registered particularly easily and immediately, so that the user is able in due time to decide on a direction in which travel is to be continued. In particular, it is thus avoided that the user has to slow down or interrupt his travel for the decision.

For improved perception, the direction arrow may be displayed in a signal color (e.g. red or yellow), significantly brighter than its surroundings, and/or in a flashing manner. Optionally, such a direction arrow may be marked in a different manner if the energy requirement is smaller than the energy quantity. In this case, the direction arrow may have a different color (e.g. green), for example.

In another embodiment of the present disclosure, the warning indication includes the visual marking of a path section in a displayed map section, wherein the path section starts at the branching point and corresponds to the direction option. Due to the combination of the representation of the branching point with the representation of the path section in the same map section, the warning indication can be registered even more easily and immediately. Inter alia, the path section may have a fixed length or reach up to the next branching point.

For improved perception, the path section may be displayed in a signal color (e.g. red or yellow), significantly brighter than its surroundings, and/or in a flashing manner. Optionally, such a path section may be visually marked in a different manner if the energy requirement is smaller than the energy quantity. In this case, the path section may be marked in green, for example.

In another embodiment of the present disclosure, the warning indication includes outputting a location at which the energy quantity stored in the energy storage unit would be expected to be reduced to zero if the vehicle were to follow the direction option. Based on the location, the user of the vehicle may possibly be able to draw conclusions as to whether he is able to continue his travel from the location or prior to reaching the location with another means of transport, whether a possibility of parking or depositing the vehicle exists at the location or before, and/or whether a possibility of having the vehicle transported to an energy charging location exists at the location or before. This information may be relevant for the user in order to decide whether he will continue his travel in accordance with the direction option despite the warning indication. Therefore, the location is potentially useful information for the user.

In another embodiment of the present disclosure, another direction option of the vehicle at the branching point is selected, and the steps c) to e) are executed for each of the selected direction options. Thus, a warning indication may be outputted also for the other direction option if the vehicle threatens to have an unwanted breakdown.

In another embodiment of the present disclosure, every direction option of the vehicle at the branching point is selected, and the steps c) to e) are executed for each of the selected direction options. Thus, the user can be warned reliably against every direction option at the branching point at which the vehicle threatens to have an unwanted breakdown.

It is to be noted that a warning indication for each of the above-mentioned direction options may include the display of a direction arrow corresponding to the direction option, the visual marking, in a displayed map section, of a path section starting at the branching point and corresponding to the direction option, and/or the outputting of a location at which the energy quantity stored in the energy storage unit would be expected to be reduced to zero if the vehicle were to follow the direction option.

Furthermore, warning indications for different direction options may also be outputted together, e.g. simultaneously. If the warning indications include displaying a direction arrow corresponding to the direction option, then direction arrows may be displayed simultaneously for different direction options. If the warning indications in each case include the visual marking, in a displayed map section, of a path section starting at the branching point and corresponding to the direction option, then path sections corresponding to different direction options may be displayed in the same map section, e.g. simultaneously.

Furthermore, a visual marking of a path section corresponding to a direction option for which the energy requirement is greater than the energy quantity may be displayed together with a visual marking of a path section corresponding to a direction option for which the energy requirement is smaller than the energy quantity.

The object on which the present disclosure is based is also achieved with a warning device for warning a user of a vehicle with an energy storage unit against an energy shortage. The warning device has the following components:

a) an energy quantity determination unit configured for determining an energy quantity stored in the energy storage unit at a branching point of a path driven on by the vehicle, b) a navigation device configured for selecting a direction option of the vehicle at the branching point, for determining the one route that is associated with the direction option and starts at the branching point, on which the vehicle is able to reach with the lowest expected energy requirement an energy charging location at which the energy storage unit can be charged, and for comparing the energy requirement with the energy quantity, and c) a warning unit configured for outputting a warning indication with which the user is warned against the direction option if the energy requirement is greater than the energy quantity.

The warning device permits the execution of the method according to the present disclosure. Therefore, the advantages of the warning device match the above-mentioned advantages of the method according to the present disclosure.

The present disclosure will now be explained in more detail with reference to the Figures.

Figure 1:
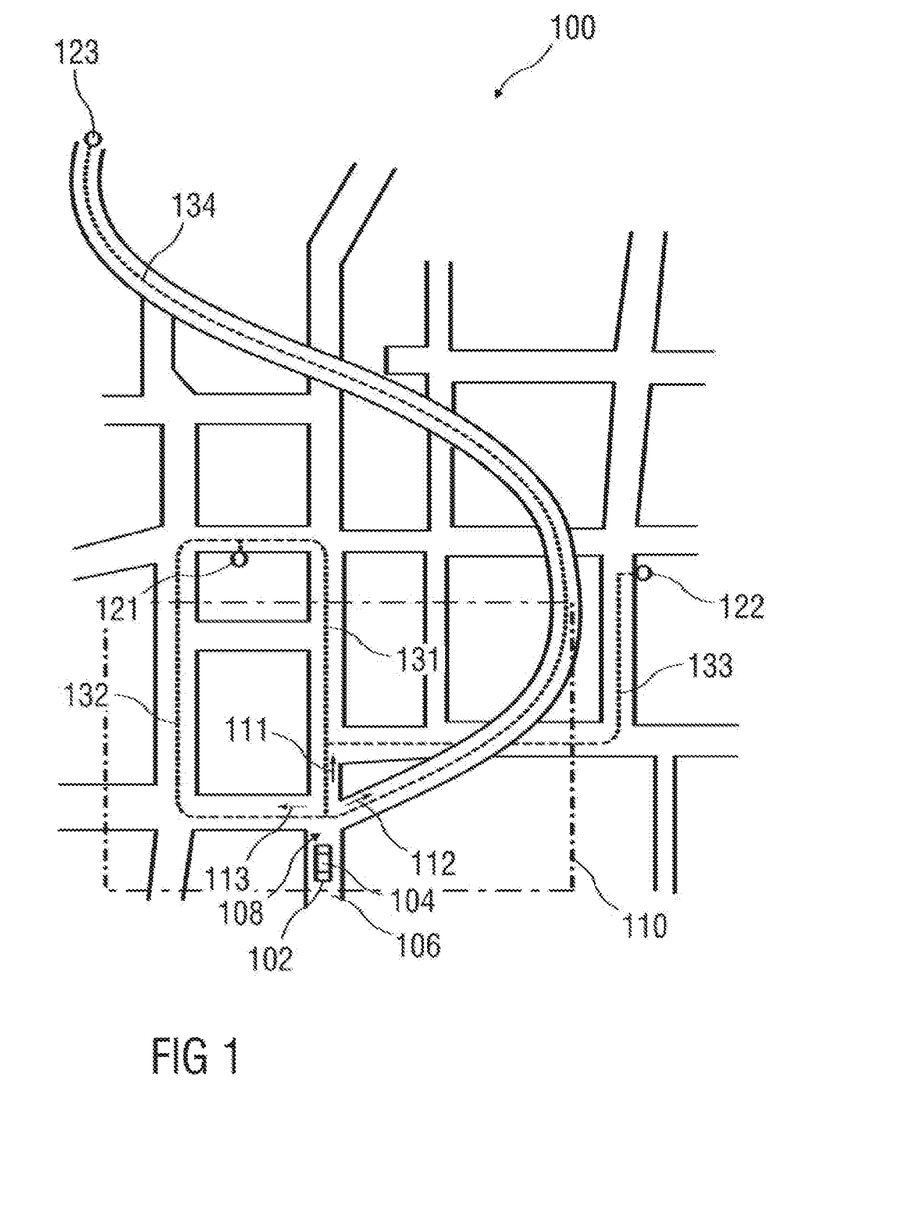
FIG. 1 shows a road network with a vehicle moving therein.

FIG. 1 shows a plan view of a road network 100 and a vehicle 102 moving therein with an energy storage unit 104.

The energy storage unit 104 serves for storing drive energy for the vehicle 102. The drive energy may be available, for example, as fuel for an internal combustion engine or as electrical energy for an electric drive motor. In the latter case, the energy storage unit 104 is a traction battery. Alternatively or additionally, the energy storage unit 104 may store energy for an air-conditioning system and/or a lighting system of the vehicle 102.

The vehicle 102, on a path 106 it drives on, approaches a branching point 108 situated in a branching area 110 of the road network 100. At the branching point, the vehicle 102 may continue its travel in accordance with one of the three direction options 111, 112 or 113. In order to take the first direction option 111, the vehicle 102 would have to travel straight ahead. In order to take the second direction option 112, the vehicle 102 would have to turn right. In order to take the third direction option 111, the vehicle 102 would have to turn left.

Three energy charging locations 121, 122, 123, at which the energy storage unit 104 can be charged in each case, are arranged in the road network 100. A first energy charging location 121 can be reached from the branching point 108 by a first route 131 associated with the first direction option 111, and by a second route 132 associated with the third direction option 113. A second energy charging location 122 can be reached from the branching point 108 by a third route 133 associated with the first direction option 111. A third energy charging location 123 can be reached from the branching point 108 by a fourth route 134 associated with the second direction option 112. In this case, a route 131 to 134 is associated with a direction option 111, 112, 113 if the route at the branching point 108 runs in the direction associated with the direction option 111, 112, 113.

Figure 2:
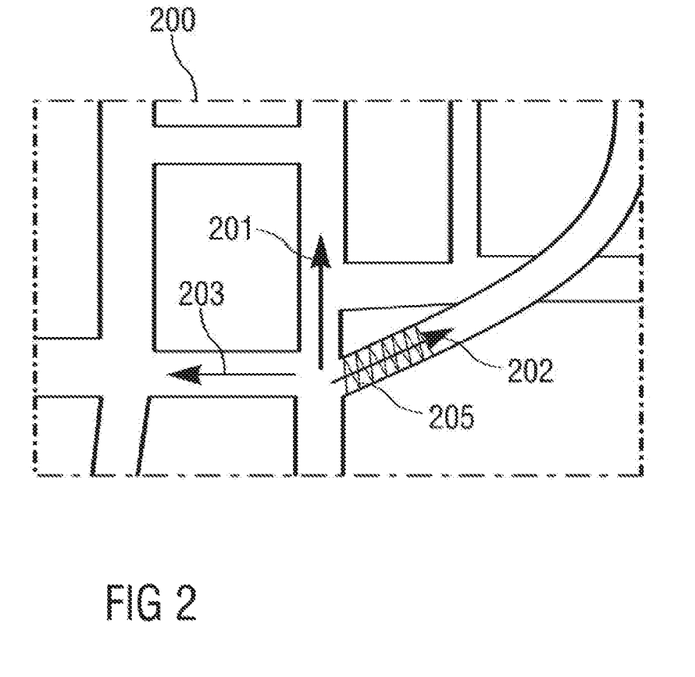
FIG. 2 shows a map section from the road network shown in FIG. 1 with a branching point.

FIG. 2 shows a map section 200 that is displayed on a screen of the vehicle 102 and corresponds to a branching area 110 of the road network 100 shown in FIG. 1. In the map section 200, the first direction option 111 at the branching point 108 is labeled with a first direction arrow 201, the second direction option 112 at the branching point 108 is labeled with a second direction arrow 202, and the third direction option 113 at the branching point 108 is labeled with a third direction arrow 203. Furthermore, a path section 205 is marked which starts at the branching point 108 and corresponds to the second direction option 112. For example, the path section 205 is highlighted by its color or cross-hatched.

Figure 3:
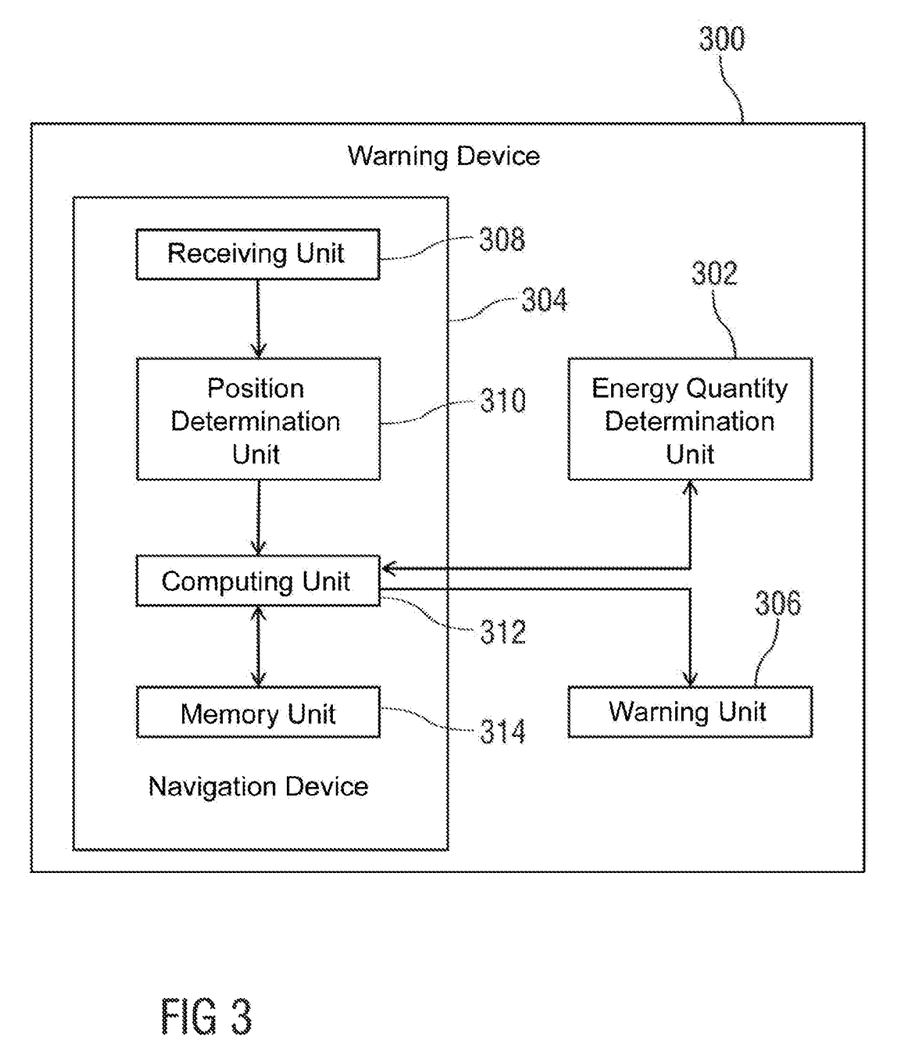
FIG. 3 shows a block diagram of a warning device according to one embodiment.

FIG. 3 shows a block diagram of a warning device 300 according to one embodiment. The warning device 300 is located in the vehicle 102 and is provided for warning a user against an energy shortage. To this end, the warning device 300 has an energy quantity determination unit 302, a navigation device 304 and a warning unit 306.

The energy quantity determination unit 302 is configured for determining an energy quantity stored in the energy storage unit 104 at a branching point of a path driven on by the vehicle. For this purpose, the energy quantity determination unit 302 is capable of detecting a filling level of the energy storage unit 104 with a filling level sensor. The energy quantity is then determined on the basis of the filling level. Alternatively, the energy quantity is estimated on the basis of the filling level and a distance of the vehicle 102 from the branching point 108, for which purpose the computing unit 312 can be used. The distance of the vehicle 102 from the branching point 108 can be determined, inter alia, from a current position of the vehicle 102 and the position of the branching point.

The navigation device 304 is firmly built into the vehicle 102, but as an alternative may also be taken along in the vehicle 102 as a portable device, which is coupled to the energy quantity determination unit 302 and the warning unit 306 via data links. Inter alia, the navigation device 304 serves for selecting a direction option of the vehicle 102 at a branching point, determining the one route that is associated with the direction option and starts at the branching point, on which the vehicle 102 is able to reach with the lowest expected energy requirement an energy charging location at which the energy storage unit 104 can be charged, and comparing the energy requirement with the energy quantity. For this purpose, the navigation device 304 has a receiving unit 308, a position determination unit 310, a computing unit 312 and a memory unit 314. Furthermore, the navigation device 304 may have further functional units not shown in FIG. 3, e.g. an operating unit, an output unit and/or a communication unit for data exchange with another electronic device.

The receiving unit 308 is configured as a satellite antenna, for example, and configured to receive satellite signals from which a geographical position of the navigation device 304 can be determined and to transmit them to the position determination unit 310.

The position determination unit 310 is configured for determining the position of the navigation device 304 based on the satellite signals and transmit it to the computing unit 312, e.g. in the form of position coordinates. For example, the receiving unit 308 is a GPS antenna, and the position determination unit 310 is a GPS receiver. As an alternative, a GALILEO receiver, a GLONASS receiver or a similar receiver may be used instead of the GPS receiver, and a corresponding satellite antenna may be used as a receiving unit 308.

The memory unit 314 has a non-volatile memory configured as an EEPROM (Electrically Erasable Programmable Read-Only Memory), for example. As an alternative, the memory unit 314 may have a different kind of memory, e.g. a Flash-EEPROM or a hard disk drive. In particular, the memory unit 314 may have several of the aforementioned memories. The memory unit 314 is connected to the computing unit 312 via a bidirectional data link. Inter alia, a map database containing a plurality of map data is stored in the memory unit 314. The map data represent objects located in a particular geographical region. The objects include, for example, paths, branching points, energy charging locations, squares, railway lines, rivers, buildings, bridges, terrains, country borders, service areas, traffic control arrangements and settlements.

As the central control module of the navigation device 304, the computing unit 312 has a processor (CPU, Central Processing Unit) and a working memory (RAM, Random Access Memory), which serves for the transitional storage of variables and intermediate results. The processor and the working memory are combined on an integrated circuit. Alternatively, the processor and the working memory may be arranged separately from each other, e.g. each on a different integrated circuit.

The warning unit 306 is configured for outputting a warning indication with which the user is warned against a direction option at a branching point if the associated energy requirement is greater than the energy quantity. For this purpose, the warning unit 306 has a display unit configured, for example, as a head-up display or screen. Inter alia, a direction arrow corresponding to the direction option can be displayed with the display unit. Furthermore, a map section, on which a path section is marked that starts at the branching point and corresponds to the direction option, can be displayed with the display unit. Optionally, the warning unit 306 has an acoustic output unit for outputting an acoustic warning signal associated with the warning indication, e.g. in the form of speech and/or warning tone.

Figure 4:
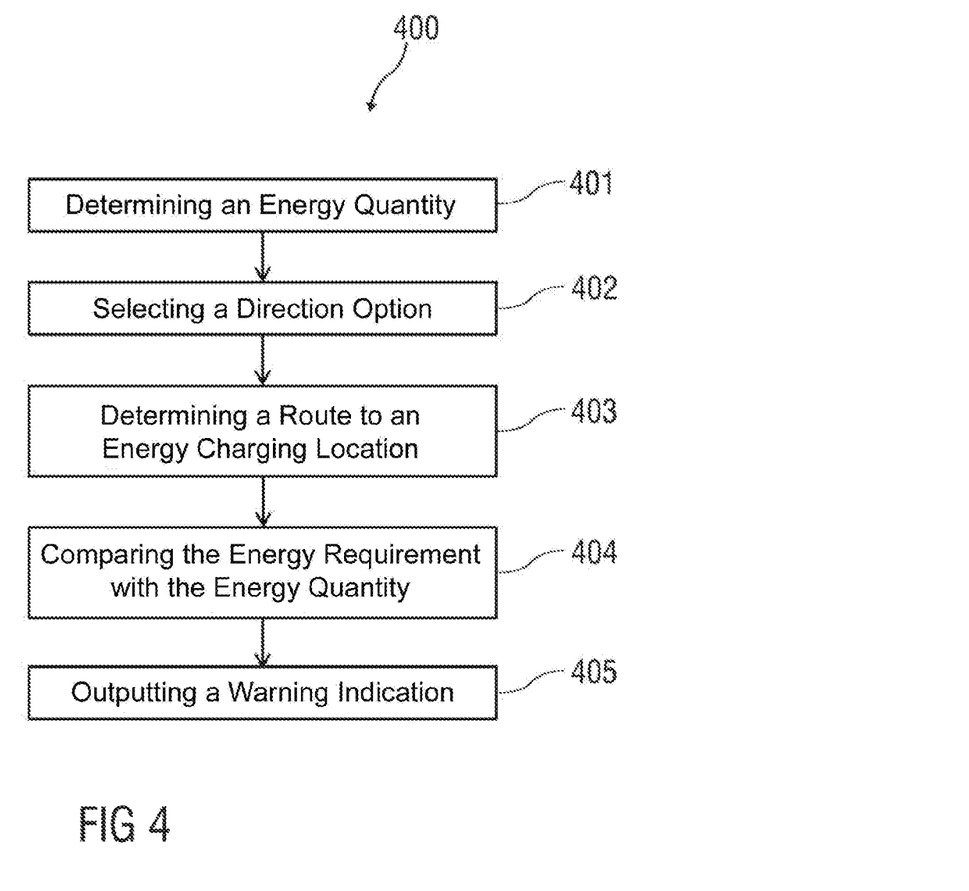
FIG. 4 shows a flow chart of one embodiment of the method.

FIG. 4 shows a flow chart of an embodiment of the method according to the present disclosure with the method steps 401 to 405. Hereinafter, reference is also made to the FIGS. 1 to 3. The method is carried out using the warning device 300. The warning device 300 is disposed in the vehicle 102 with the energy storage unit 104. The vehicle 102 drives on the path 106 and approaches the branching point 108. The vehicle 102 approaching the branching point 108 is detected by the navigation device 304 using the position determination unit 310 and map data stored in the memory unit 314.

In the first method step 401, an energy quantity which is (expected to be) stored in the energy storage unit 104 at the branching point 108 is determined by means of the energy quantity determination unit 302. For this purpose, a current filling level of the energy storage unit 104 is determined, and a current energy quantity of the energy storage unit 104 is derived from this. Further, a distance of the vehicle 102 from the branching point 108 is determined, and an expected energy requirement of the vehicle 102 up to this branching point 108 is derived therefrom. The expected energy requirement is subtracted from the current energy quantity, with the energy quantity stored in the energy storage unit 104 at the branching point 108 being the result.

For this purpose, the distance of the vehicle 102 from the branching point 108 is calculated from a current position of the vehicle 102 determined by the position determination unit 310 and a position of the branching point represented by the map data. If the distance is below a predefined threshold value, the energy quantity stored in the energy storage unit 104 at the branching point 108 may be estimated solely on the basis of the filling level without taking the distance into account.

In the second method step 402, the direction option 112 of the vehicle 102 at the branching point 108 is selected by means of the computing unit 312.

In the third method step 403, using the computing unit 312, the one route is determined for the direction option 112 that starts at the branching point 108, on which the vehicle 102 is able to reach, with the lowest expected energy requirement of energy stored in the energy storage unit 104, an energy charging location at which the energy storage unit 104 can be charged. In the present case, the route 134 is determined on which the vehicle 102 is able to reach the energy charging location 123. Further, the energy requirement with which the vehicle 102 is able to reach the energy charging location 123 on the route 134 is associated with the direction option 112.

In the fourth method step 404, the energy requirement associated with the direction option 112 is compared with the energy quantity determined above by means of the computing unit 312. In the present case, it is found that the energy requirement is greater than the energy quantity.

This causes a warning indication warning the user against the direction option 112 being outputted by means of the warning unit 306 in the fifth method step 404. The warning indication includes displaying the direction arrow 202 corresponding to the direction option 112 in the color red. In addition, the warning indication includes the visual marking of the path section 205 in the displayed map section 200, wherein the path section 205 starts at the branching point 108 and corresponds to the direction option 112. The warning indication may also include a location at which the energy quantity stored in the energy storage unit 104 would be expected to be reduced to zero if the vehicle 102 were to follow the direction option 112. Thus, the method for the direction option 112 is completed.

Optionally, the direction option 113 is additionally selected, and the method steps three through five are carried out for the direction option 113.

For this purpose, the route 132 is determined, by means of the computing unit 312 in the third method step 403, on which the vehicle 102 is able to reach the energy charging location 121. Further, the energy requirement with which the vehicle 102 is able to reach the energy charging location 121 on the route 132 is associated with the direction option 113.

In the fourth method step 404, the energy requirement associated with the direction option 113 is compared with the energy quantity determined above by means of the computing unit 312. In the present case, it is found that the energy requirement is smaller than the energy quantity.

Therefore, a warning indication warning the user against the direction option 112 is not outputted in the fifth method step 405. Instead, the direction option 113 is marked in the map section 200 with the green direction arrow 203 as being non-critical. Thus, the method for the direction option 113 is completed.

As another option, the direction option 111 is also selected, and the method steps three through five are carried out for the direction option 111.

For this purpose, several routes that are associated with the direction option 111 and start at the branching point 108 are determined, by means of the computing unit 312 in the third method step 403, on which the vehicle 102 is able in each case to reach an energy charging location. Specifically, one route 131 is determined on which the vehicle 102 is able to reach the energy charging location 121. Further, one route 133 is determined on which the vehicle 102 is able to reach the energy charging location 122. Further, the lowest energy requirement out of the expected energy requirement with which the vehicle 102 is able to reach the energy charging location 121 on the route 132 and the expected energy requirement with which the vehicle 102 is able to reach the energy charging location 122 on the route 133 is determined and associated with the direction option 111.

In the fourth method step 404, the energy requirement associated with the direction option 111 is compared with the energy quantity determined above by means of the computing unit 312. In the present case, it is found that the energy requirement is smaller than the energy quantity.

Therefore, a warning indication warning the user against the direction option 111 is not outputted in the fifth method step 405. Instead, the direction option 111 is marked in the map section 200 with the green direction arrow 201 as being non-critical. Thus, the method is completed for all three direction options 111, 112, 113, but may be carried out again at another branching point reached by the vehicle 102.

What is claimed is:

1. A method for warning a user of a vehicle with an energy storage unit against an energy shortage, comprising the following steps:
   determining an energy quantity stored in the energy storage unit before the vehicle reaches a branching point of a path driven on by the vehicle;
   providing different direction options of the vehicle at the branching point, wherein each of the different direction options provides a route to an energy charging location;
   selecting a direction option from the different direction options and performing the following for the selected direction option:
      determining a route to an energy charging location at which the energy storage unit can be charged, wherein the determined route is associated with a respective selected direction option that starts at the branching point, which the vehicle is able to reach with a lowest expected energy requirement;

comparing an energy requirement to reach the energy charging location with the energy quantity; and outputting a warning indication with which the user is warned against the selected direction option when the energy requirement is greater than the energy quantity; and providing a location at which the energy quantity stored in the energy storage unit be reduced to zero if the vehicle were to follow the selected direction option with an energy requirement greater than the energy quantity.

2. The method of claim 1, wherein the energy quantity is determined before the vehicle reaches the branching point.

3. The method of claim 1, wherein the route is determined by:

determining several routes that are associated with the selected direction option and start at the branching point, on which the vehicle is able, in each case, to reach the energy charging location at which the energy storage unit can be charged;

calculating an expected energy requirement for each of the routes; and selecting a route with a lowest calculated expected energy requirement.

4. The method of claim 3, wherein each of the several routes leads to a different energy charging location.

5. The method of claim 1, wherein the warning indication includes displaying a direction arrow corresponding to the direction option.

6. The method of claim 1, wherein the warning indication includes a visual marking of a path section in a displayed map section, wherein the path section starts at the branching point and corresponds to the direction option.

7. A warning device for warning a user of a vehicle with an energy storage unit against an energy shortage, comprising:

an energy quantity determination unit configured to determine an energy quantity stored in the energy storage unit before the vehicle reaches a branching point of a path driven on by the vehicle;

a navigation device configured to provide different direction options of the vehicle at the branching point, wherein each of the direction options provides a route to an energy charging location, to select a direction option from the different direction options and, for each of the selected direction options, to determine a route to an energy charging location at which the energy storage unit can be charged, wherein the determined route is associated with the selected direction option which starts at the branching point, on which the vehicle is able to reach a lowest expected energy requirement, and to compare an energy requirement to reach the energy charging location with the energy quantity; and a warning unit configured to output, for each of the selected direction options, a warning indication against the direction option when the energy requirement of a respective direction option is greater than the energy quantity, and to provide a location at which the energy quantity stored in the energy storage unit be reduced to zero if the vehicle were to follow the selected direction option with an energy requirement greater than the energy quantity.

\* \* \* \* \*